United States Patent
Jacques

Patent Number: 5,937,574
Date of Patent: Aug. 17, 1999

[54] APPARATUS AND METHOD FOR SUPPLYING LIQUID TO A TREE STAND

[76] Inventor: David R. Jacques, 22 Forest Park Rd., Dracut, Mass. 01826

[21] Appl. No.: 08/857,237

[22] Filed: May 16, 1997

[51] Int. Cl.⁶ .......... A47G 7/02; A01G 29/00; F16K 31/18
[52] U.S. Cl. .......... 47/40.5; 47/48.5; 137/414; 137/449
[58] Field of Search .......... 47/40.5, 48.5, 47/79, 81; 137/414, 449

[56] References Cited

U.S. PATENT DOCUMENTS

| | | | |
|---|---|---|---|
| 1,551,808 | 9/1925 | Dixon | 137/449 |
| 1,623,374 | 4/1927 | Anderson | 137/449 |
| 1,783,891 | 12/1930 | Thibert | 137/449 |
| 1,796,443 | 3/1931 | Da Costa | 137/449 |
| 2,500,215 | 3/1950 | Swearingen | 248/46 |
| 2,543,849 | 3/1951 | Hendrickson | 248/44 |
| 2,682,889 | 7/1954 | McLaughlin | 137/449 |
| 4,065,095 | 12/1977 | Johnson | 137/414 |
| 4,180,095 | 12/1979 | Johnson | 137/414 |
| 4,420,904 | 12/1983 | Joswig et al. | 47/81 |
| 4,653,224 | 3/1987 | Weckesser | 47/40.5 |
| 4,669,347 | 6/1987 | Kuhnley | 248/516 |
| 4,825,587 | 5/1989 | Stancil | 47/40.5 |
| 4,930,252 | 6/1990 | Krause et al. | 47/40.5 |
| 4,993,176 | 2/1991 | Spinosa | 40/40.5 |
| 5,009,028 | 4/1991 | Lorenzana et al. | 47/40.5 |
| 5,016,389 | 5/1991 | Odom, Jr. | 47/48.5 |
| 5,076,009 | 12/1991 | Cibor | 47/40.5 |
| 5,076,010 | 12/1991 | Rollins | 47/62 |
| 5,090,443 | 2/1992 | Jacobsen | 137/429 |
| 5,111,611 | 5/1992 | Elder | 47/40.5 |
| 5,157,868 | 10/1992 | Munox | 47/40.5 |
| 5,201,140 | 4/1993 | Voorhis | 47/40.5 |
| 5,243,782 | 9/1993 | Jones | 47/40.5 |
| 5,279,071 | 1/1994 | McDougall | 47/40.5 |
| 5,363,591 | 11/1994 | Jones | 47/40.5 |
| 5,369,910 | 12/1994 | Copenhaver | 47/40.5 |
| 5,421,361 | 6/1995 | Johnson | 137/414 |
| 5,473,837 | 12/1995 | Skoczylas et al. | 47/40.5 |
| 5,502,924 | 4/1996 | Lee | 47/79 |
| 5,558,030 | 9/1996 | Ward | 111/7.2 |
| 5,671,562 | 9/1997 | Fah | 47/79 |
| 5,678,600 | 10/1997 | Locke et al. | 137/414 |
| 5,791,082 | 8/1998 | Finello | 47/40.5 |

FOREIGN PATENT DOCUMENTS

| | | | |
|---|---|---|---|
| 2050552 | 3/1993 | Canada | 47/40.5 |
| 2386985 | 12/1978 | France | 47/40.5 |
| 2106221 | 9/1972 | German Dem. Rep. | 47/40.5 |
| 3421733 | 12/1985 | Germany | 47/40.5 |

Primary Examiner—Michael J. Carone
Assistant Examiner—Frederick T. French, III
Attorney, Agent, or Firm—Pearson & Pearson

[57] ABSTRACT

A system for providing a liquid to a plant or tree stand comprising a liquid reservoir connected via tubing to a liquid control assembly having a liquid level control section positioned on the lower end of an adjustable vertical section with straps for attachment to a tree. The liquid level control section comprises a lever arm/float assembly positioned within the tree stand for maintaining a predetermined liquid level within the tree stand. As the liquid in the tree stand is depleted the float drops and the opposite end of a float lever arm penetrates a channel raising a metal ball which permits liquid to enter the tree stand through the liquid level control assembly connected to the tubing from the reservoir. As the liquid rises in the tree stand, the float is forced upward causing the opposite end of the float lever to drop resulting in the metal ball lowering to seal the channel thereby stopping the liquid flow into the tree stand.

23 Claims, 3 Drawing Sheets

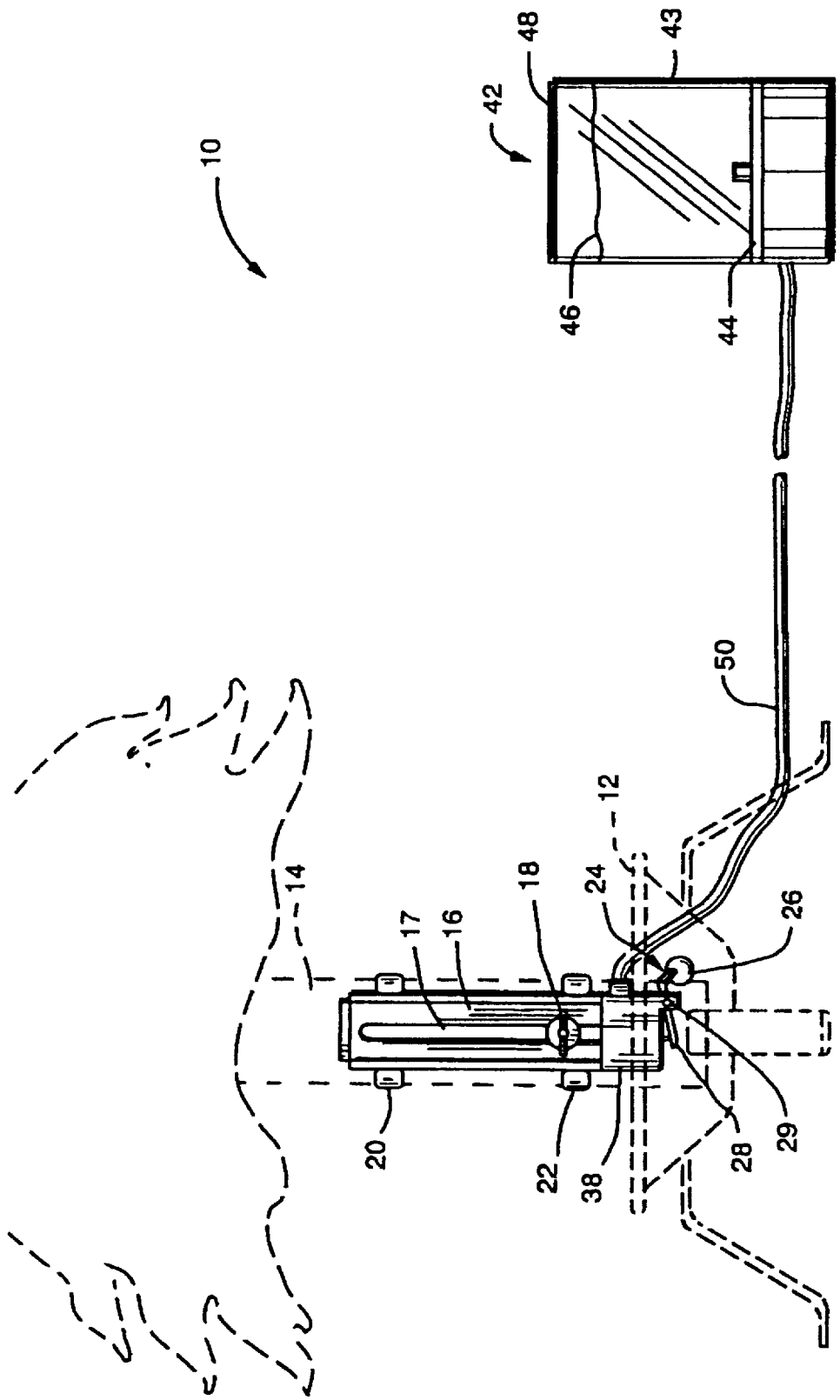

APPARATUS AND METHOD FOR SUPPLYING LIQUID TO A TREE STAND

BACKGROUND OF THE INVENTION

1. Field of the Invention

This invention relates to an apparatus and method for providing a liquid such as water to a tree stand and in particular to a float assembly for automatically allowing liquid to enter the tree stand from a reservoir when the liquid level goes below a predetermined level.

2. Description of the Related Art

The need for keeping a Christmas tree watered has always been known in order to prevent the tree from drying out and becoming a fire hazard. Many consumers no longer purchase real Christmas trees but instead purchase the so called imitation trees in order to avoid the constant attention and added work of watering Christmas trees.

Previous types of tree waterers have not been totally reliable such as when rubber stoppers are used to block water flow and corrosion or dirt particles result in unreliable operation generally allowing water to leak into a tree stand causing an overflow. Another problem occurs when the height of a reservoir container is increased relative to the respective height of the tree stand, and resulting pressure differences cause water flow stoppage means to permit an unwanted inflow of water resulting in an overflow.

Many different types of tree waterers have been previously provided. For example, In U.S. Pat. No. 4,825,587, a Christmas tree having water level switch and a water reservoir having a water pump are disclosed. However, the pump is electrically operated and therefore requires an electrical power source. In U.S. Pat. No. 4,930,252, issued to Krause, a tree stand having a water reservoir comprises an electrically controlled water level monitor for keeping water in a tree stand. In U.S. Pat. No. 4,993,176, an ornamental reservoir has an air hose and a water hose extended to a tree stand container; the ends of the hoses are cut on a bias and when the air hose is opened to air due to the lowering of the water in the container, water flows from the reservoir to the container.

In U.S. Pat. No. 5,009,028, a cut tree watering system is described comprising a reservoir of water adjacent to a tree stand having a delivery tube extending from the reservoir to the tree stand to provide a siphon action for maintaining a constant water level in the tree stand.

In U.S. Pat. No. 5,076,009, a water supply system for a Christmas tree stand is shown comprising an elevated table top reservoir connected via tubing to a seated float valve assembly mounted along-side the tree trunk by cinch straps encircling a housing extension member. The float element will seat and unseat as necessary to maintain the water at a specific level, the float assembly is installed at the appropriate water level desired in the base sufficient to keep the tree trunk immersed in the water.

In U.S. Pat. No. 5,090,443, a valve for controlling the level of fluids in basins is disclosed such as for a Christmas tree stand. The valve comprises a float within a float chamber and when the water in the chamber rises, the float rises pushing up a flexible tubing and blocking or pinching off the flexible tubing to stop the water from entering the float chamber.

In U.S. Pat. No. 5,157,868, issued to Munoz, a Christmas tree irrigation and fluid monitoring system for supplying water to a conventional tree stand is disclosed. A water reservoir is equipped with a translucent column through which the fluid line can be monitored. The reservoir has a tamper resistant mark and a cover forming a water tight seal; it also has an aperture for allowing air to enter the reservoir. The reservoir connects to the tree stand via a conduit having a crush resistant collar for fitting at the tree end.

The prior art has tried to provide a safe, simple, aesthetic and convenient apparatus and method of automatically watering a Christmas tree and monitoring of the water level in the reservoir. However, problems resulting from corrosion of the water shut-off mechanism or the height variations of the water reservoir causing overflow of the water stand have not produced satisfied consumers nor extensive use of such products. The present invention overcomes these problems.

SUMMARY OF THE INVENTION

Accordingly, it is therefore an object of this invention to reliably supply a liquid to a tree positioned in a stand.

It is another object of the invention to provide a reliable Christmas tree watering system that inherently protects against water overflow from the tree stand.

It is another object of this invention to provide a tree watering system having a water shut-off control which is not affected by the height of a reservoir.

It is a further object of this invention to provide a means of easily and securely attaching a liquid control assembly to a tree or plant base.

It is another object of this invention to be able to adjust the height of the liquid control assembly within a tree stand.

These and other objects are accomplished by providing a first liquid reservoir within the stand for positioning a tree in the reservoir, means coupled to the tree, having a portion positioned in the first liquid reservoir, for controlling a liquid level in the first liquid reservoir, a second liquid reservoir spaced apart from the first liquid reservoir, means connected between the first liquid reservoir and the second liquid reservoir for transferring a liquid from the second reservoir to the first reservoir in accordance with the liquid level controlling means, the liquid level controlling means comprises (a) a channel in such liquid level controlling means for passage of the liquid from an inlet to an outlet, (b) a ball means positioned in the channel for blocking the passage of the liquid, and (c) a float means attached to a lower end of the liquid level controlling means for controlling the flow of the liquid into the first liquid reservoir, the float means being positioned in the first liquid reservoir wherein a high liquid level causes the float to move in a first direction to stop the liquid flow into the first liquid reservoir and a low liquid level causes the float means to move in a second direction to start the liquid flow into the first reservoir. The liquid comprises water. The float means comprises a lever arm suspended on a pin between two posts on the lower end of the liquid level controlling means wherein the lever arm rotates about the pin, the lever arm comprises a stud positioned on an upper surface of the lever arm near a first end for insertion into the outlet of the liquid level controlling means to raise the ball means and allow the passage of the liquid, the lever arm having a second end extending downward at an angle of approximately 45°, and a float attached to the second end of the lever arm. The liquid level controlling means comprises a first section for attaching to the tree, the first section having a concave surface facing the tree. The first section comprises straps for retaining the first section against the tree. The liquid level controlling means comprises a second section which slides within the first section, and a liquid level assembly positioned on the lower end of the second section for controlling the liquid level. The channel comprises an insert means for enabling the ball means to seal the channel outlet through which the liquid otherwise flows, the insert means having a narrower opening at a lower end than the diameter of the ball means. The lower end of the channel partially extends into the channel outlet enabling the ball means to seal the channel opening through which the liquid otherwise flows. An adjusting means secures the second section within the first section at a height in accordance with a predetermined liquid level.

The objects are further accomplished by providing a tree watering apparatus comprising means for attaching the apparatus to a base of a tree secured in a vertical position of a tree stand, means positioned on a lower portion of the apparatus for controlling a water level in a reservoir when the lower portion of the apparatus is positioned in the reservoir, the water level controlling means comprises a channel for passage of water from an inlet to an outlet, ball means positioned in the channel for blocking the passage of the water, float means attached to the lower end of the water level controlling means for controlling the flow of the water into the reservoir, the float means positioned in the reservoir wherein a high water level causes the float means to move in a first direction to stop the water flow into the reservoir and a low water level causes the float means to move in a second direction to start the water flow into the reservoir. The float means comprises a lever arm suspended by a pin between two posts on the lower end of the water level controlling means wherein the lever arm rotates about the pin, the lever arm comprises a stud positioned on an upper surface of the lever arm near a first end for insertion into the outlet of the water level controlling means to raise the ball means and allow the passage of the water, the lever arm having a second end extending downward at an angle of approximately 45°, and a float attached to a second end of the lever arm. The water level controlling means comprises a first section for attaching to the tree, the first section having a concave surface facing the tree. The first section comprises straps for retaining the first section against the tree. The water level controlling means comprises a second section which slides within the first section, and a water level assembly is positioned on the lower end of the second section for controlling the water level. The channel comprises an insert means for enabling the ball means to seal the channel outlet through which the water otherwise flows, the insert means having a narrower opening at a lower end than the diameter of the ball means. The lower end of the channel partially extends into the channel outlet enabling the ball means to seal the channel opening through which the water otherwise flows. An adjusting means secures the second section within the first section at a height in accordance with a predetermined liquid level. The float means comprises a lever arm having a stud, positioned on an upper surface of the lever arm near a first end, for insertion of the stud into the outlet of the water level controlling means in order to raise the ball means and allow passage of the water. The float means comprises a float attached to a second end of the lever arm, the float causing the lever arm to move in accordance with the water level changes.

The objects are further accomplished by a method of supplying a liquid to a tree stand comprising the steps of providing a first liquid reservoir within the tree stand for positioning a lower portion of a tree in the reservoir, controlling a liquid level in the first liquid reservoir with means coupled to the tree and positioned a predetermined distance within the first liquid reservoir, positioning a second liquid reservoir a predetermined distance from the first liquid reservoir, transferring a liquid from the second reservoir to the first reservoir in accordance with the liquid level controlling means, providing a channel in the liquid level controlling means for passage of the liquid from an inlet to an outlet, enclosing a ball means within said channel for blocking said passage of said liquid, and controlling the flow of the liquid into the first liquid reservoir by float means attached to a lower end of the liquid level controlling means wherein a high liquid level causes the float to move in a first direction to stop the liquid flow into the first liquid reservoir and a low liquid level causes the float to move in a second direction to start the liquid flow into the first liquid reservoir. The step of positioning a second liquid reservoir a predetermined distance from the first liquid reservoir comprises the step of filling the second reservoir with water. The method comprises the steps of suspending a lever arm on a pin between two posts extending below the liquid level controlling means wherein the lever arm rotates about the pin. The step of controlling the flow of the liquid by the float means comprises the steps of suspending a lever arm on a pin between two posts on the lower end of the liquid level controlling means wherein the lever arm rotates about the pin, positioning a stud on a first end of an upper surface of the lever arm for insertion into the outlet of the channel thereby raising the ball means in the channel to allow passage of the liquid, and attaching a float ball to a second end of the lever arm extending downward at approximately 45°.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 1 is a front elevational view of the invention having a first portion attached to a Christmas tree extending into a stand, a second portion being a free standing reservoir, and a tube connected between the reservoir and the stand;

DESCRIPTION OF ILLUSTRATIVE EMBODIMENTS

Figure 5:
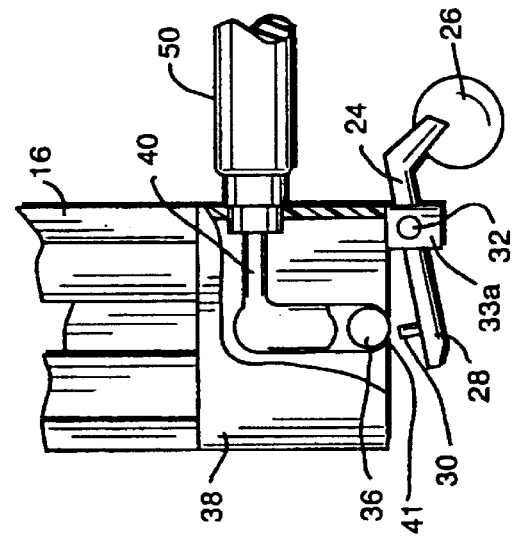
FIG. 5 is an alternate embodiment of the invention showing the lower end of the liquid outlet channel of the liquid control section extending partially into the channel causing the combination of the ball and channel to seal off liquid flow.

Referring now to FIG. 1, a front elevational view of the invention is shown comprising a liquid supply system 10 for maintaining a liquid such as water level around a tree 14 particularly a Christmas tree, or for supplying a tree or plant with liquid nutrients or plant food.

The liquid supply system 10 comprises a plant or tree stand 12 for holding a tree in a vertical direction and for holding a liquid such as water, a liquid control assembly 11 for controlling the height of the liquid in the tree stand 12 and a reservoir 42 for storing a liquid or water supply.

The liquid control assembly 11 comprises a first portion having an adjustable vertical section 16 for attachment by means of straps, such as Velcro® straps or Velcro® straps combined with elastic materials commonly known in the art, to a tree 14 held in a vertical position by the tree stand 12. A second portion comprises a liquid level control section 38 which is positioned on the lower end of the adjustable vertical section 16 and it extends within the tree stand 12. Water or another liquid is provided to the liquid level control section 38 by means of a tube 50 connected between the liquid level control section 38 and the reservoir 42 for holding the liquid reserve 46.

The reservoir 42 portion comprises a container 43 having a strainer 44 on the bottom for screening the liquid reserve 46 in order to prevent blockage of a tube 50. The strainer 44 meshes may vary depending on the liquid composition. A perforated or vented cover 48 is provided for the top of the container 43 and one end of the tube 50 attaches to the lower side portion of the container 43. The container 43, strainer 44 and cover 48 may be embodied with plastic material readily known in the art. The tube 50 may also be embodied with a flexible, plastic, cylindrical material.

Figure 2:
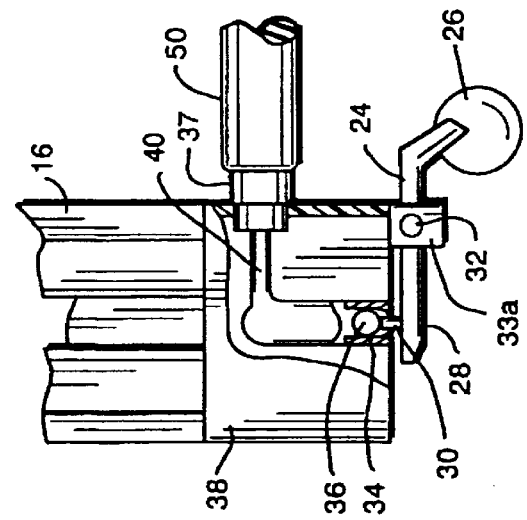
FIG. 2 is an enlarged front elevational view partly in section of the lower portion of the invention having an adjustable vertical section and a liquid control section for extending into a tree stand.

Referring now to FIG. 2, the liquid level control section 38 comprises a right-angle channel 40 with a first opening or inlet on the right side of the liquid level control section 38. A plug 37 is inserted into this first opening or inlet having an external male extension for receiving a tube 50. A second opening or outlet of the right angle channel 40 is on the bottom of the liquid level control section 38. A ball 36 comprising stainless steel, ceramic or other smooth and noncorrosive material is inserted into this opening followed by a brass cylindrical bushing 34 which is then pushed into this bottom opening and fixed into position by means of a friction fit against the inner wall of the right angle channel 40. The ball 36 moves freely within the vertical portion of the right angle channel 40 and is prevented from exiting by the narrower brass bushing 34. The portion of the right angle channel 40 extending to the inlet side of the liquid level control section 38 has a smaller inside diameter opening than the diameter of the metal ball 36 so the ball 36 moves only in the vertical direction.

Figure 4:
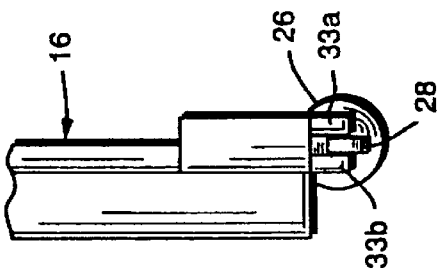
FIG. 4 is a side elevational view of the liquid control section showing the lever arm positioned between two posts.

Referring now to FIG. 2 and FIG. 4, on the bottom right side of the liquid level control section 38 two spaced apart posts 33a and 33b extend downward. In FIG. 4, both posts 33a and 33b are shown. A lever arm 24 is placed within the space between posts 33a and 33b and held in position by a pin 32 extending through post 33a, the lever arm 24 and post 33b. The lever arm 24 freely rotates about the pin 32. A first end of the lever arm 24 comprises an upward extending stud 30 which extends up into the right angle channel 40 causing the ball 36 to be raised from its closure position in the lower end of the right angle channel 40. This allows the liquid such as water to flow through the right angle channel 40 into the tree stand 12. A second end of the lever arm 24 has a float 26 attached thereto. Further as seen in FIG. 2, the lever arm 24 is angled at approximately 45 degrees from the horizontal in a downward direction at approximately two-thirds of the distance along the lever arm 24 starting at the first end so that when the larger portion of the lever arm 24 is in a horizontal position, the float 26 is positioned below the pin 32. In this position, water flows through the right angle channel 40 into the tree stand 12. The float 26 is made of a lightweight material such as a foam plastic having a lower density than water, for example, in order to create strong buoyancy forces on the float 26 when the liquid level in the tree stand rises, but heavy enough to overcome the weight of the ball and water pressure when the water level drops.

Figure 3:
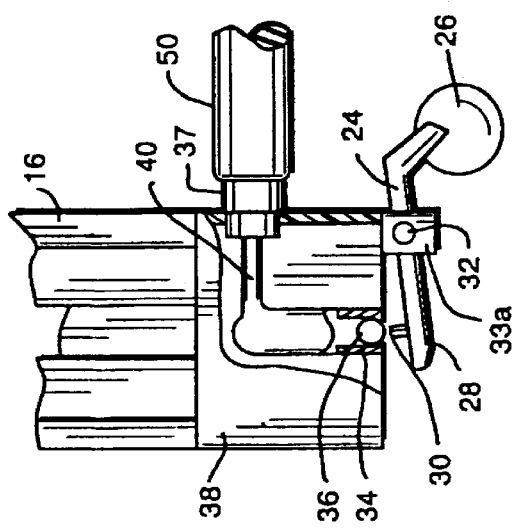
FIG. 3 is an enlarged front elevational view partly in section similar to FIG. 2 but showing the float in a raised position causing the ball to drop down in an inlet channel stopping the flow of a liquid.

Referring now to FIG. 3, the lever arm 24 is shown in a different position than in FIG. 2. In FIG. 3, the float 26 is raised relative to its position in FIG. 2 so that the stud 30 at the other end of the lever arm 24 no longer extends into the lower end outlet of the right angle channel 40 thereby allowing the ball 36 to block the opening at such lower end. Liquid pressure above the ball 36 contributes to a tight seal. This results in the stoppage of any liquid flow into the tree stand 12. Hence, variations in the height of the reservoir 42 do not affect the reliability of liquid stoppage by the ball 36.

Referring now to FIG. 5, an alternate embodiment of the liquid control section 38 is shown which primarily differs from FIG. 2 by not having the bushing 34 inserted in the lower end outlet of the right angle channel 40. In FIG. 5, the lower edges 41 of the right angle channel extend into the channel providing a smaller diameter outlet opening than the diameter of the ball 36 and providing a resting surface for the ball 36, thereby blocking any water flow when the ball 36 rests on these lower edges 41. This embodiment eliminates the need for the metal bushing 34 in FIG. 2. The liquid lever control section 38 in this embodiment comprises two sections in order to insert the ball 36 into the right angle channel 40. The two sections are secured together by means of glue or other adhesives readily known in the art.

Figure 6:
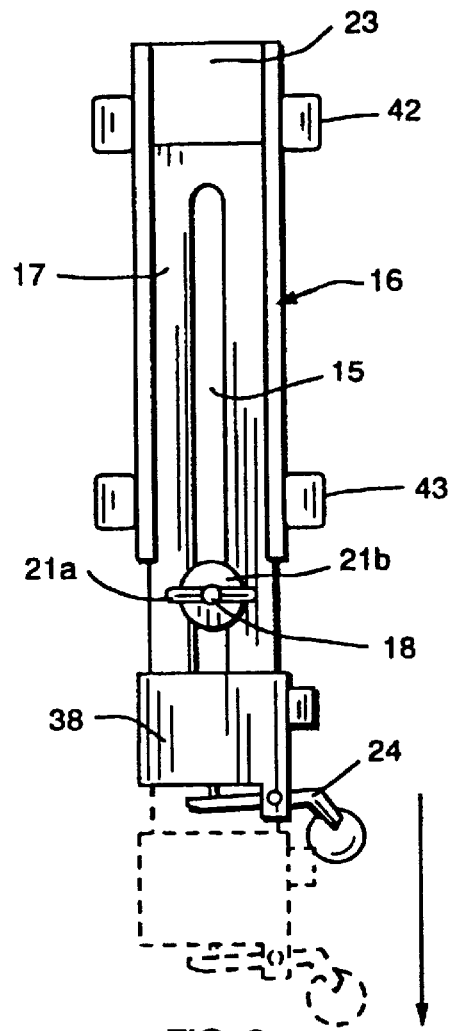
FIG. 6 is a an elevational front view of the adjustable vertical section for adjusting the position of the liquid control section down into the tree stand.

Referring now to FIG. 6, an elevational front view of the adjustable vertical section 16 is shown. The adjustable vertical section 16 comprises an outer housing 23, the front of which is mostly open except for the side walls 27 extending briefly around to the front. A panel 17 has an open slot 15 running through the center of the panel 17 for a major portion of the length of the panel 17. The panel 17 is inserted between the side walls 27 of the outer housing 23. The panel 17 is held in a predetermined position within the outer housing 23 by means of a screw 18 inserted in a hole from behind the outer housing 34 as shown in FIG. 6 with the screw threads protruding through the slot 15. A wing nut 21a and washer 21b locks the panel 17 into position against the outlet housing 23. The hole for the screw 15 is counter sunk on the back side of outer housing 23 so that the head of the screw 18 is flush with the back surface of the outer housing 23. The adjustable vertical panel 17 permits the positioning of the liquid level control section assembly 38 within the tree stand 12 at various levels as illustrated by the dotted lines in FIG. 6.

Figure 7:
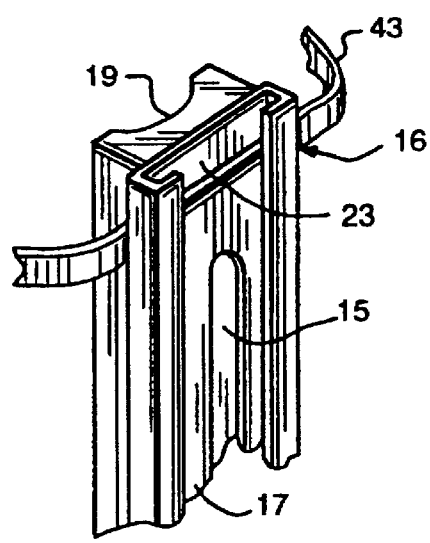
FIG. 7 is a perspective view of the adjustable vertical section showing the concave rear section which rests against the tree and provides stability.

Referring now to FIG. 7, a perspective view of the adjustable vertical section 16 is shown having a concave rear section 19 attached to the back of the outer housing 16. The concave rear section 19 provides for matching the contour of the tree trunk in order to make a secure attachment of the water control assembly 11 to the tree using the straps 41 43 provided.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. Apparatus for supplying liquid to a tree stand comprising:
    a first liquid reservoir within said stand for positioning a tree in said reservoir;
    means coupled to said tree, having a liquid level assembly positioned in said first liquid reservoir, for controlling a liquid level in said first liquid reservoir;
    a second liquid reservoir spaced apart from said first liquid reservoir;
    means connected between said first liquid reservoir and said second liquid reservoir for transferring a liquid from said second reservoir to said first reservoir in accordance with said liquid level controlling means;
    said liquid level controlling means comprises:
    (a) a channel in such liquid level controlling means for passage of said liquid from an inlet to an outlet;
    (b) a ball means positioned in said channel for blocking said passage of said liquid;
    (c) a float means attached to a lower end of said liquid level controlling means for controlling the flow of said liquid into said first liquid reservoir, said float means being positioned in said first liquid reservoir wherein a high liquid level causes said float means to move in a first direction to stop said liquid flow into said first liquid reservoir and a low liquid level causes said float means to move in a second direction to start said liquid flow into said first reservoir;
    (d) a first section for attaching to said tree;
    (e) a second section which slides within said first section; and
    (f) said liquid level assembly being positioned on the lower end of said second section for controlling said liquid level.

2. The apparatus as recited in claim 1 wherein said liquid comprises water.

3. The apparatus as recited in claim 1 wherein said float means comprises:
    a lever arm suspended on a pin between two posts on the lower end of said liquid level controlling means wherein said lever arm rotates about said pin;
    said lever arm comprises a stud positioned on an upper surface of said lever arm near a first end for insertion into said outlet of said liquid level controlling means to raise said ball means and allow said passage of said liquid;
    said lever arm having a second end extending downward at an angle of approximately 45°; and
    a float attached to said second end of said lever arm.

4. The apparatus as recited in claim 1 wherein said first section comprises straps for retaining said first section against said tree.

5. The apparatus as recited in claim 1 wherein said channel comprises an insert means for enabling said ball means to seal said channel outlet through which said liquid otherwise flows, said insert means having a narrower opening at a lower end than the diameter of said ball means.

6. The apparatus as recited in claim 1 wherein said lower end of said channel partially extends into said channel outlet enabling said ball means to seal the channel opening through which said liquid otherwise flows.

7. The apparatus as recited in claim 1 wherein an adjusting means secures the second section within said first section at a height in accordance with a predetermined liquid level.

8. A tree watering apparatus comprising:
    means for attaching a first section of said apparatus to a base of a tree secured in a vertical position of a tree stand;
    means positioned on a lower portion of a second section of said apparatus for controlling a water level in a reservoir when said lower portion of said apparatus is positioned in said reservoir, said second section slidably attached within said first section;
    said water level controlling means comprises a channel for passage of water from an inlet to an outlet;
    ball means positioned in said channel for blocking said passage of said water;
    float means attached to the lower end of said water level controlling means for controlling the flow of said water into said reservoir, said float means positioned in said reservoir wherein a high water level causes said float means to move in a first direction to stop said water flow into said reservoir and a low water level causes said float means to move in a second direction to start said water flow into said reservoir.

9. The apparatus as recited in claim 8 wherein said float means comprises:
    a lever arm suspended by a pin between two posts on the lower end of said water level controlling means wherein said lever arm rotates about said pin;
    said lever arm comprises a stud positioned on an upper surface of said lever arm near a first end for insertion into said outlet of said water level controlling means to raise said ball means and allow said passage of said water;
    said lever arm having a second end extending downward at an angle of approximately 45°; and
    a float attached to a second end of said lever arm.

10. The apparatus as recited in claim 8 wherein said first section comprises straps for retaining said first section against said tree.

11. The apparatus as recited in claim 8 wherein said channel comprises an insert means for enabling said ball means to seal said channel outlet through which said water otherwise flows, said insert means having a narrower opening at a lower end than the diameter of said ball means.

12. The apparatus as recited in claim 8 wherein said lower end of said channel partially extends into said channel outlet enabling said ball means to seal the channel opening through which said water otherwise flows.

13. The apparatus as recited in claim 8 wherein an adjusting means secures the second section within said first section at a height in accordance with a predetermined liquid level.

14. The apparatus as recited in claim 8 wherein said float means comprises a lever arm having a stud, positioned on an upper surface of said lever arm near a first end, for insertion of said stud into said outlet of said water level controlling means in order to raise said ball means and allow passage of said water.

15. The apparatus as recited in claim 14 wherein said float means comprises a float attached to a second end of said lever arm, said float causing said lever arm to move in accordance with said water level changes.

16. A method of supplying a liquid to a tree stand comprising the steps of:
    providing a first liquid reservoir within said tree stand for positioning a lower portion of a tree in said reservoir;
    controlling a liquid level in said first liquid reservoir with means having a first section coupled to said tree and sliding a second section within said first section for positioning a liquid level controlling means attached to said second section within said first liquid reservoir positioned a predetermined distance within said first liquid reservoir;

positioning a second liquid reservoir a predetermined distance from said first liquid reservoir;

transferring a liquid from said second reservoir to said first reservoir in accordance with said liquid level controlling means;

providing a channel in said liquid level controlling means for passage of said liquid from an inlet to an outlet;

enclosing a ball means within said channel for blocking said passage of said liquid; and controlling the flow of said liquid into said first liquid reservoir by float means attached to a lower end of said liquid level controlling means wherein a high liquid level causes said float to move in a first direction to stop said liquid flow into said first liquid reservoir and a low liquid level causes said float to move in a second direction to start said liquid flow into said first liquid reservoir.

17. The method as recited in claim 16 wherein said step of positioning a second liquid reservoir a predetermined distance from said first liquid reservoir comprises the step of filling said second reservoir with water.

18. The method as recited in claim 16 wherein said method comprises the steps of:

suspending a lever arm on a pin between two posts extending below said liquid level controlling means wherein said lever arm rotates about said pin.

19. The method as recited in claim 16 wherein said step of controlling the flow of said liquid by said float means comprises the steps of:

suspending a lever arm on a pin between two posts on the lower end of said liquid level controlling means wherein said lever arm rotates about said pin;

positioning a stud on a first end of an upper surface of said lever arm for insertion into said outlet of said channel thereby raising said ball means in said channel to allow passage of said liquid; and attaching a float ball to a second end of said lever arm extending downward at approximately 45°.

20. The method as recited in claim 16 wherein said step of of coupling said first section to said tree includes providing a concave surface to face said tree.

21. The method as recited in claim 16 wherein said step of providing a channel comprises the step of providing an insert in said channel outlet to enable said ball to seal said channel through which said liquid otherwise flows, said insert means having a narrower opening at a lower end than the diameter of said ball means.

22. The method as recited in claim 16 wherein said step of providing a channel comprises the step of partially extending said lower end of said channel outlet into said channel enabling said ball means to seal said channel outlet through which said liquid otherwise flows.

23. The method as recited in claim 16 wherein said step of sliding a second section within said first section of said means for controlling a liquid level comprises the step of securing said second section at a height within said first section in accordance with a predetermined liquid level.

* * * * *